United States Patent Office 3,721,427
Patented Mar. 20, 1973

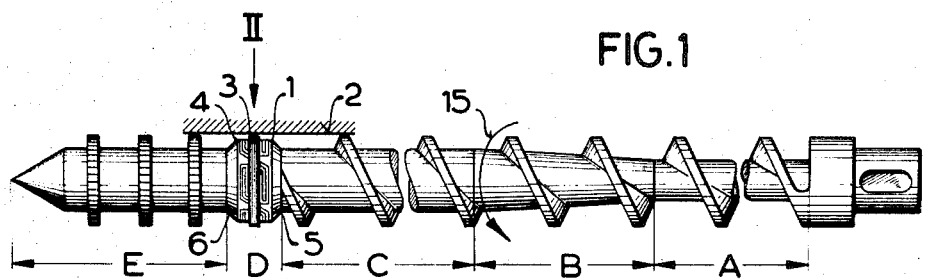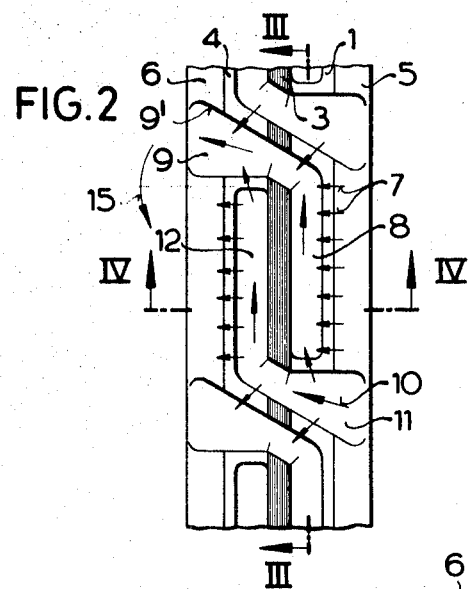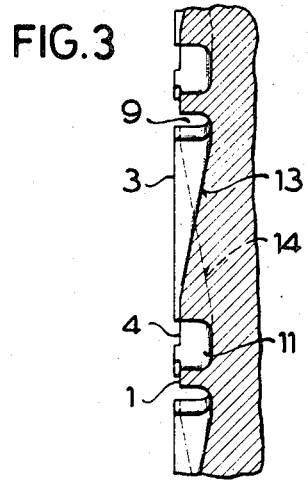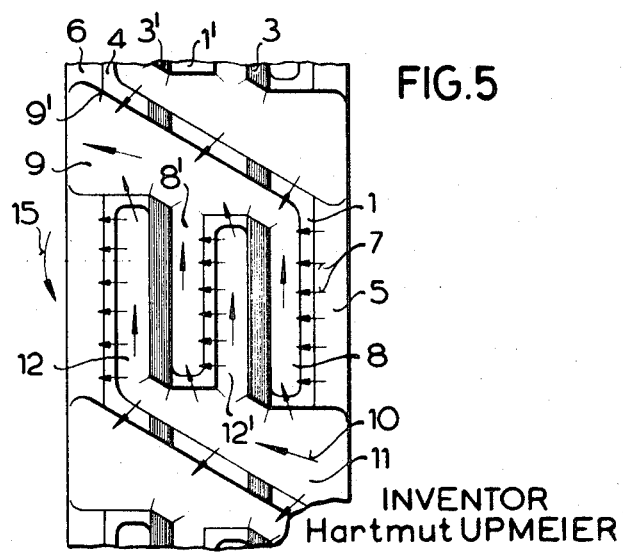

3,721,427
EXTRUDER FOR WORKING ON THERMOPLASTIC MATERIALS AND NON-CROSS-LINKED ELASTOMERIC MATERIALS
Hartmut Upmeier, Tecklenburg, Germany, assignor to Windmoller & Holscher, Lengerich, Westphalia, Germany
Filed Apr. 20, 1971, Ser. No. 135,604
Claims priority, application Germany, Apr. 22, 1970, P 20 19 522.6
Int. Cl. B01f 7/08
U.S. Cl. 259—191
8 Claims

ABSTRACT OF THE DISCLOSURE

Thermoplastics and elastomers are extrudable more rapidly from a screw extruder if the zones of the screw where the material is melted and mixed have interposed therebetween a shear zone provided with at least two spaced circumferential beads each of which defines a narrow flow gap with the cylinder in which the screw is rotatable, a further bead which is a sealing fit in the cylinder being provided between the gap-defining beads. A circumferentially extending flow passage is provided between the further bead and each gap-defining bead, the first flow passage (as viewed length-wise of the screw) communicating with the mixing zone through at least one discharge passage and the second flow passage communicating with the melting zone through at least one supply passage.

---

The invention relates to an extruder for working on thermoplastic materials and non-cross-linked elastomeric materials, the extruder being provided with a feed screw which is provided with a melting zone, a homogenising zone and a mixing zone in that order.

It has hitherto been difficult to obtain fully uniform heating and homogenisation of the melted material, especially in the case of extruders of which the feed screws are turned at high speeds in order to obtain a correspondingly high output of extruded material and thus maximum utilisation of the extruder. Since with the use of conventional feed screws without special homogenising means a quality limit is reached at a certain speed of the feed screw, that is to say the extruded product is useless if produced at above a predetermined rotary speed of the feed screw because it is spoiled by non-disintegrated or improperly fused particles of the raw material, numerous constructions of feed screws have already been suggested with a view to increasing the feed screw speed before the quality limit is reached.

In some constructions, damming beads are provided at the end of the screw to cause the material to remain under the effects of the feed screw for a longer period and therefore ensure that more of the material becomes disintegrated. In other constructions, the end of the screw or an intermediate section is provided with so-called torpedo mixing portions which are either smooth and cylindrical over a length of about three times the screw diameter or are slightly conical, without feeding lands, the torpedo mixing portions defining a precise flow gap together with the wall of the cylinder in which the screw rotates or being provided with additional parallel grooves which are usually slightly helical. In still further constructions, interruptions are provided in the lands of the screw or eccentric kneading sections are provided on the core of the screw.

All these known constructions have a common disadvantage, namely, although there is a certain improvement in the homogenising or mixing effect, the output of the extruded material will be throttled and there will therefore be overheating of the material at high screw speeds. Such screws can therefore not be used for plastics which are sensitive in shear, for example hard PVC or cross-linked elastomers, because the homogenising elements impede rather than enhance the flow of the material and therefore give rise to localised decomposition of the material or its vulcanisation to parts of the extruder.

A feed screw is also known wherein the homogenising zone is provided with axially extending channels interspersed by shear ridges which define narrow gaps with the cylinder wall. The material must pass from one of the axial channels through a shear gap into an adjacent channel from which it is then fed to the mixing zone. Since the material will be continually rolled in the axial channels, its quality is inferior.

The invention aims to provide a form of feed screw which avoids the aforementioned disadvantages but provides an evenly homogeneous material even at high screw speeds and outputs. For the purpose of the invention, use is made of a screw which has five zones, namely a zone at which the plastics material is drawn in, a compacting zone, a melting zone, a homogenising or shear zone and a mixing zone. In the shear zone, the as yet non-homogeneous melted or heated material is to be subjected to an accurately defined shear effect along as short a length of the screw as possible so as to become intensively homogenised for a short period. The shape of the shear portion should ensure that every particle of the material is only once subjected to shear and then ejected from the shear zone. The subsequent mixing zone for unifying differences in the temperature of the material and possibly also evenly distributing any pigment that has been introduced is preferably constructed on the known principle of flow dividing and mixing, several known mixing systems being suitable for this purpose.

According to the invention, an extruder for thermoplastic and non-cross-linked elastomeric materials comprises a cylinder containing a rotary feed screw having a melting zone, a mixing zone and, between said zones, a shear zone for homogenising the molten material, the shear zone being provided with at least two annular beads which extend circumferentially of the screw core, are spaced from one another axially of the screw and have a height such that a narrow flow gap for the molten material is defined between each bead and the cylinder wall, wherein a further annular bead which is a sealing fit in the cylinder is provided between the gap-defining beads, wherein, further, a circumferentially extending flow passage for the molten material is provided between the said further bead and each gap-defining bead, and wherein the first flow passage (as viewed lengthwise of the screw) communicates with the said mixing zone through at least one discharge passage whilst the second flow passage communicates with the said melting zone through at least one supply passage.

By means of the invention, a portion of the material from the melting zone is introduced into the first flow passage through the flow or shear gap associated therewith and homogenised at the same time, whereupon this portion reaches the mixing zone without again being subjected to shear, whilst another portion is fed, without being subjected to shear, through the supply passage into the second flow passage that lies behind the aforementioned further bead, whereupon it reaches the mixing zone via the flow or shear gap formed by the second gap-defining bead. Both portions or streams of material are therefore only once subjected to shear. The overall length of the shear gaps is considerably greater compared with the extent of a single annular bead. This results in a marked reduction in the flow resistance for identical dimensions of the shear gap, whereby disadvantageous excessive throttling and overheating of the material are avoided. By forming the shear zone in accordance with the invention, it is therefore possible to subject the material to intensive shear effect along a short length and with flow resistance so that uniform homogenisation can be achieved at a high output. The intensity of the shearing effect permits the pitch of the screw to be greater than the conventional pitch of about one diameter and it also enables the depth of the screw thread to be greater than for conventional screws so that the volume and capacity of the feed screw are increased.

Preferably, the discharge and supply passages extend substantially axially of the cylinder, the discharge passage and its associated flow passage forming a first substantially L-shaped passage which communicates with the mixing zone and the supply passage and its associated flow passage forming a second substantially L-shaped passage which communicates with the melting zone. The discharge and supply passages are separated from the second and first L-shaped passages, respectively, by walls which are a sealing fit in the cylinder or which define with the cylinder wall further flow or shear gaps of the same height as those formed by the said gap-defining beads. The flow passages, that is to say the circumferentially extending parts of the L-shaped passages, may diverge, preferably in depth, towards the associated axially extending discharge and supply passages so as to be adapted to the increases or decrease in flow caused by the passage of the material through the shear gaps. Further, the discharge and supply passages are preferably inclined to the periphery of the screw in the sense of enhancing the flow of the material and it is advantageous from the point of view of obtaining good flow characteristics if the gap-defining beads are bevelled at the sides facing the respective melting and mixing zones.

In order to increase the effective length of the shear gaps still further and thereby reduce the resistance to flow, or rather in order to increase the maximum possible output of the extruder, the shear zone may be provided with three of the aforementioned gap-defining beads, two of the said further annular beads interspersed therebetween and a circumferentially extending flow passage between each further bead and each gap-defining bead. In fact, even more than three gap-defining beads may be provided, with a corresponding increase in the number of further annular beads and circumferentially extending flow passages. The aforementioned L-shaped passages will be F-shaped when there are three gap-defining beads or comb-shaped if there are still more gap-defining beads, a shear or flow gap being provided not only between the first and last annular bead and the adjoining zones of the screw but also between those of the adjacent flow passages between which there is no annular bead that is a sealing fit in the cylinder. Each bead having a sealing effect with the cylinder is required so that the material, after being subjected to a shear effect in the flow gap, will pass to the mixing zone without again being subjected to shear.

The shear zone may be formed on a replaceable portion of the feed screw so that, if the sensitive shear gap is damaged by any metallic particles that are accidentally introduced together with the granulated plastic raw material, it can be renewed without having to replace the entire feed screw.

Examples of the invention will now be described with reference to the accompanying diagrammatic drawings, wherein:

FIG. 1 is a fragmentary side elevation of a feed screw for an extruder;

FIG. 2 is a developed fragmentary view of the shear zone of the FIG. 1 screw;

FIG. 3 is a part-section taken on the line III—III in FIG. 2;

FIG. 4 is a part-section taken on the line IV—IV in FIG. 2, and

FIG. 5 is a view corresponding to that of FIG. 2 but showing the shear zone of a second embodiment of feed screw.

FIG. 1 illustrates a feed screw comprising a drawing-in zone A for raw material, a compression zone B, a melting and feed zone C, a shear zone D and a mixing zone E. The shear zone D is formed by a replaceable ring portion of the screw and is provided, axially behind one another, an annular bead 1, which defines a shear or flow gap $x^1$ (FIG. 4) together with the wall 2 of a cylinder in which the feed screw is rotatable, an annular bead 3 which is a sealing fit in the cylinder and has been emphasised by longitudinal hatching in FIGS. 1 and 2, and an annular bead 4 which defines a flow or shear gap $x^2$ with the cylinder wall 2. The shear gaps $x^1$ and $x^2$ are preferably equally wide. The end faces of the beads 1 and 4 are bevelled as shown at 5 and 6 to enhance the flow of the material that is to be extruded.

Pairs of L-shaped passages 8, 9 and 11, and 12 are formed in the shear zone by circumferentially extending flow passages 8, 12 associated respectively with a discharge passage 9 and a supply passage 11. Molten material from the melting zone C therefore flows through the shear zone in part-streams 7 and 10. The course of the part-stream 7 is through the shear gap $x^1$ into the flow or collecting passages 8 from which the plasticized material reaches the mixing zone E through the connnecting or discharge passages 9 which each have a side 9' inclined against the direction 15 (FIG. 1) of rotation of the screw so as to enhance flow. The course of the part-stream 10 is through the connecting or supply passages 11 into the distributing passages 12, the material still being unhomogenised, through the shear gap $x^2$, where the material is homogenised, and then directly to he mixing zone E. As will be evident from the drawing, the unhomogenised material of each part-stream 10 can also pass from the supply passage 11 of one of the L-shaped passages directly into the discharge passage 9 of an adjoining L-shaped passage but it must thereby traverse a gear gap of the same size as the gaps $x^1$ and $x^2$.

In the passages 8 and 12 which diverge and converge, respectively in depth as shown at 13 and 14, respectively, in FIG. 3, the molten material is conveyed along the shear zone without being subjected to any marked further uncontrolled shearing effect, effective feeding being enhanced by the circumferential disposition of the passages 8 and 12. It should be noted that with the arrangement of the passages 8, 9, 11 and 12 and inclination of the walls 9' as illustrated, the feed screw must be turned in the direction of the arrow 15 in FIG. 1. For rotation of the screw in the opposite direction, the discharge passages 9 and supply passages 11 should have an inclination which is a mirror image of that shown in the drawings.

By providing the shear zone C on a replaceable ring, it can be renewed by itself if it happens to be damaged by foreign matter. If desired, the shear zone D may be provided intermediate the ends of the melting zone C, provided that the screwthreads of the melting zone C downstream of the shear zone D are sufficiently shallow to assume the required mixing function.

In the embodiment of FIG. 5, the resistance to flow of the material through the shear zone has been still further reduced by combining two shear units of the kind illustrated in FIG. 2. An annular bead 3 which is a sealing fit in the cylinder for the screw is followed by a bead 1', which defines a shear gap with the cylinder wall, and a further bead 3' which is a sealing fit in the cylinder. Each supply passage 11 communicates with two circumferentially extending flow passages 12 and 12' and each discharge passage 9 communicates with two circumferentially extending flow passages 8 and 8'. Instead of the L-shaped passages of FIG. 2, therefore, there are F-shaped passages of which the limbs of the F are interspersed. It will be evident that for a greater overall length of the shear gaps, the number of FIG. 2 shear units can be still further increased in which case all the circumferential flow passages will be interspersed in a comb-like arrangement.

By means of the invention, the axial extent of the shear zone can be kept quite short and it can be manufactured comparatively simply by means of turning and milling, for example with the aid of an indexing head. It should be emphasized that there is considerable freedom of design for the shear zone. In the case of small screw diameters a single pair of passages 8, 9 and 11, 12 may be sufficient and for larger diameters the number of pairs of passages can be correspondingly increased so that all the conditions as referred to one pair will be substantially the same for all screw sizes. Further, as already mentioned, the number of annular beads has practically no limits.

What is claimed is:

1. An extruder for thermoplastic and non-cross-linked elastomeric materials, comprising a cylinder containing a rotary feed screw having a melting zone, a mixing zone and, between said zones, a shear zone for homogenising the molten material, the shear zone being provided with at least two annular beads which extend circumferentially of the screw core, are spaced from one another axially of the screw and have a height such that a narrow flow gap for the molten material is defined between each bead and the cylinder wall, wherein a further annular bead which is a sealing fit in the cylinder is provided between the gap-defining beads, wherein, further, a circumferentially extending flow passage for the molten material is provided between the said further bead and each gap-defining bead, and wherein the first flow passage (as viewed lengthwise of the screw) communicates with the said mixing zone through at least one discharge passage whilst the second flow passage communicates with the said melting zone through at least one supply passage.

2. An extruder according to claim 1, wherein the discharge and supply passages extend substantially axially of the cylinder, the discharge passage and its associated flow passage forming a first substantially L-shaped passage which communicates with the mixing zone and the supply passage and its associated flow passage forming a second substantially L-shaped passage which communicates with the melting zone, and wherein the discharge and supply passages are separated from the second and first L-shaped passages, respectively, by walls which are a sealing fit in the cylinder or which define with the cylinder wall further flow gaps of the same height as those formed by the said gap-defining beads.

3. An extruder according to claim 2, wherein the said flow passages diverge towards the associated discharge and supply passages.

4. An extruder according to claim 3, wherein the flow passages diverge in depth.

5. An extruder according to claim 2, wherein the discharge and supply passages are inclined to the periphery of the screw in the sense of enhancing the flow of the material.

6. An extruder according to claim 1, wherein the gap-defining beads are bevelled at the sides facing the respective melting and mixing zones.

7. An extruder according to claim 1, wherein the shear zone is provided with three said gap-defining beads, two said further annular beads dispersed therebetween and a circumferentially extending flow passage between each further feed and gap-defining bead.

8. An extruder according to claim 1, wherein the shear zone is formed on a replaceable portion of the screw.

References Cited
UNITED STATES PATENTS

| | | | |
|---|---|---|---|
| 2,817,876 | 12/1957 | Gandelli | 259—91 |
| 3,115,674 | 12/1963 | Schrenk | 259—191 |
| 3,300,810 | 1/1967 | Gregory | 259—191 |
| 3,564,651 | 2/1971 | Covington | 425—200 |

ROBERT W. JENKINS, Primary Examiner